(12) United States Patent
Topol

(10) Patent No.: US 11,971,052 B1
(45) Date of Patent: *Apr. 30, 2024

(54) MODAL NOISE REDUCTION FOR GAS TURBINE ENGINE

(71) Applicant: RTX CORPORATION, Farmington, CT (US)

(72) Inventor: David A. Topol, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,336

(22) Filed: Aug. 2, 2023

Related U.S. Application Data

(63) Continuation of application No. 17/689,260, filed on Mar. 8, 2022, now Pat. No. 11,754,094, which is a
(Continued)

(51) Int. Cl.
*F04D 29/66* (2006.01)
*F01D 5/02* (2006.01)
(Continued)

(52) U.S. Cl.
CPC .............. *F04D 29/661* (2013.01); *F01D 5/02* (2013.01); *F01D 5/12* (2013.01); *F01D 5/26* (2013.01);
(Continued)

(58) Field of Classification Search
CPC ...... F01D 5/186; F01D 25/12; F05D 2220/32; F05D 2240/12; F05D 2240/30; F05D 2260/202
See application file for complete search history.

(56) References Cited

U.S. PATENT DOCUMENTS 2,258,792 A   10/1941 New
2,936,655 A   5/1960 Peterson et al.
(Continued)

FOREIGN PATENT DOCUMENTS

DE   102006060694 A1 * 6/2008 ............ F01D 25/04
EP   0791383 A1   8/1997
(Continued)

OTHER PUBLICATIONS

QCSEE main reduction gears bearing development program final report. (1975). NASA-CR-134890. Dec. 1, 1975. pp. 1-41.
(Continued)

*Primary Examiner* — Brian Christopher Delrue
(74) *Attorney, Agent, or Firm* — Carlson, Gaskey & Olds, P.C.

(57) ABSTRACT

A gas turbine engine according to an aspect of the present disclosure includes, among other things, propulsor means, first compression means, second compression means, reduction means for reducing a rotational speed of an output that drives the propulsor means relative to an input, first expansion means for driving the second compression means, and second expansion means for driving the input of the reduction means. The first compression means includes a plurality of arrays of rotor blades and a plurality of arrays of stator vanes arranged in a plurality of compression stages. A factor (F) is defined as a total number of the rotor blades in an array of the plurality of arrays divided by a total number of the stator vanes in an adjacent array of the plurality of arrays. The factor (F) is between 1.19 and 1.55 for at least two of the arrays of the rotor blades.

20 Claims, 4 Drawing Sheets

Related U.S. Application Data continuation of application No. 16/532,554, filed on Aug. 6, 2019, now Pat. No. 11,300,141, which is a continuation of application No. 14/680,409, filed on Apr. 7, 2015, now Pat. No. 10,371,168.

(51) Int. Cl.

| | | |
|---|---|---|
| *F01D 5/12* | (2006.01) | |
| *F01D 5/26* | (2006.01) | |
| *F01D 9/04* | (2006.01) | |
| *F01D 25/04* | (2006.01) | |
| *F04D 29/32* | (2006.01) | |
| *F04D 29/54* | (2006.01) | |

(52) U.S. Cl.
CPC ............ *F01D 9/041* (2013.01); *F01D 25/04* (2013.01); *F04D 29/324* (2013.01); *F04D 29/544* (2013.01); *F04D 29/66* (2013.01); *F04D 29/663* (2013.01); *F04D 29/666* (2013.01); *F05D 2260/96* (2013.01); *Y02T 50/60* (2013.01)

(56) References Cited

U.S. PATENT DOCUMENTS

| | | | |
|---|---|---|---|
| 3,021,731 A | | 2/1962 | Stoeckicht |
| 3,194,487 A | | 7/1965 | Tyler et al. |
| 3,287,906 A | | 11/1966 | Mccormick |
| 3,352,178 A | | 11/1967 | Lindgren et al. |
| 3,412,560 A | | 11/1968 | Gaubatz |
| 3,664,612 A | | 5/1972 | Skidmore et al. |
| 3,747,343 A | * | 7/1973 | Rosen ................ F02K 3/06 416/245 A |
| 3,754,484 A | | 8/1973 | Roberts |
| 3,765,623 A | | 10/1973 | Donelson et al. |
| 3,820,719 A | | 6/1974 | Clark et al. |
| 3,843,277 A | | 10/1974 | Ehrich |
| 3,883,264 A | * | 5/1975 | Rao ................ F04D 29/544 415/209.1 |
| 3,892,358 A | | 7/1975 | Gisslen |
| 3,932,058 A | | 1/1976 | Harner et al. |
| 3,935,558 A | | 1/1976 | Miller et al. |
| 3,988,889 A | | 11/1976 | Chamay et al. |
| 4,130,872 A | | 12/1978 | Haloff |
| 4,220,171 A | | 9/1980 | Ruehr et al. |
| 4,240,250 A | | 12/1980 | Harris |
| 4,284,174 A | | 8/1981 | Salvana et al. |
| 4,289,360 A | | 9/1981 | Zirin |
| 4,478,551 A | | 10/1984 | Honeycutt, Jr. et al. |
| 4,649,114 A | | 3/1987 | Miltenburger et al. |
| 4,696,156 A | | 9/1987 | Burr et al. |
| 4,722,357 A | | 2/1988 | Wynosky |
| 4,883,240 A | * | 11/1989 | Adamson ................ B64C 11/00 416/129 |
| 4,979,362 A | | 12/1990 | Vershure, Jr. |
| 5,058,617 A | | 10/1991 | Stockman et al. |
| 5,102,379 A | | 4/1992 | Pagluica et al. |
| 5,141,400 A | | 8/1992 | Murphy et al. |
| 5,169,288 A | * | 12/1992 | Gliebe ................ F02C 7/045 415/119 |
| 5,317,877 A | | 6/1994 | Stuart |
| 5,361,580 A | | 11/1994 | Ciokajlo et al. |
| 5,433,674 A | | 7/1995 | Sheridan et al. |
| 5,447,411 A | | 9/1995 | Curley et al. |
| 5,466,198 A | | 11/1995 | McKibbin et al. |
| 5,524,847 A | | 6/1996 | Brodell et al. |
| 5,634,767 A | | 6/1997 | Dawson |
| 5,677,060 A | | 10/1997 | Terentieva et al. |
| 5,692,702 A | | 12/1997 | Andersson |
| 5,778,659 A | | 7/1998 | Duesler et al. |
| 5,857,836 A | | 1/1999 | Stickler et al. |
| 5,915,917 A | | 6/1999 | Eveker et al. |
| 5,975,841 A | | 11/1999 | Lindemuth et al. |
| 5,985,470 A | | 11/1999 | Spitsberg et al. |
| 6,223,616 B1 | | 5/2001 | Sheridan |
| 6,315,815 B1 | | 11/2001 | Spadaccini et al. |
| 6,318,070 B1 | | 11/2001 | Rey et al. |
| 6,387,456 B1 | | 5/2002 | Eaton, Jr. et al. |
| 6,517,341 B1 | | 2/2003 | Brun et al. |
| 6,607,165 B1 | | 8/2003 | Manteiga et al. |
| 6,709,492 B1 | | 3/2004 | Spadaccini et al. |
| 6,814,541 B2 | | 11/2004 | Evans et al. |
| 6,883,303 B1 | | 4/2005 | Seda |
| 7,021,042 B2 | | 4/2006 | Law |
| 7,219,490 B2 | | 5/2007 | Dev |
| 7,328,580 B2 | | 2/2008 | Lee et al. |
| 7,374,403 B2 | | 5/2008 | Decker et al. |
| 7,591,754 B2 | | 9/2009 | Duong et al. |
| 7,632,064 B2 | | 12/2009 | Somanath et al. |
| 7,662,059 B2 | | 2/2010 | McCune |
| 7,806,651 B2 | | 10/2010 | Kennepohl et al. |
| 7,824,305 B2 | | 11/2010 | Duong et al. |
| 7,828,682 B2 | | 11/2010 | Smook |
| 7,891,943 B2 | | 2/2011 | Tsuchiya et al. |
| 7,926,260 B2 | | 4/2011 | Sheridan et al. |
| 7,997,868 B1 | | 8/2011 | Liang |
| 8,205,432 B2 | | 6/2012 | Sheridan |
| 8,246,292 B1 | | 8/2012 | Morin et al. |
| 8,534,991 B2 | | 9/2013 | Topol |
| 11,085,453 B2 | * | 8/2021 | Sahota ................ F04D 19/02 |
| 2006/0228206 A1 | | 10/2006 | Decker et al. |
| 2008/0003096 A1 | | 1/2008 | Kohli et al. |
| 2008/0022691 A1 | * | 1/2008 | Kennepohl ................ F01D 5/10 60/792 |
| 2008/0116009 A1 | | 5/2008 | Sheridan et al. |
| 2008/0317588 A1 | | 12/2008 | Grabowski et al. |
| 2009/0056343 A1 | | 3/2009 | Suciu et al. |
| 2009/0304518 A1 | | 12/2009 | Kodama et al. |
| 2009/0314881 A1 | | 12/2009 | Suciu et al. |
| 2010/0105516 A1 | | 4/2010 | Sheridan et al. |
| 2010/0148396 A1 | | 6/2010 | Xie et al. |
| 2010/0212281 A1 | | 8/2010 | Sheridan |
| 2010/0218483 A1 | | 9/2010 | Smith |
| 2010/0331139 A1 | | 12/2010 | McCune |
| 2011/0123342 A1 | * | 5/2011 | Topol ................ F04D 29/544 416/223 R |
| 2011/0159797 A1 | | 6/2011 | Beltman et al. |
| 2011/0293423 A1 | | 12/2011 | Bunker et al. |
| 2012/0117975 A1 | | 5/2012 | Sharma et al. |
| 2012/0124964 A1 | | 5/2012 | Hasel et al. |
| 2012/0174593 A1 | * | 7/2012 | Sharma ................ F01D 5/142 60/774 |
| 2013/0040545 A1 | | 2/2013 | Finney |
| 2013/0202403 A1 | * | 8/2013 | Morin ................ F02K 3/06 415/122.1 |
| 2013/0205795 A1 | * | 8/2013 | Garg ................ F01D 5/142 415/208.1 |
| 2013/0219922 A1 | | 8/2013 | Gilson et al. |
| 2014/0271112 A1 | * | 9/2014 | Morin ................ F02C 7/36 415/119 |

FOREIGN PATENT DOCUMENTS

| | | | | |
|---|---|---|---|---|
| EP | 1142850 A1 | | 10/2001 | |
| EP | 3181884 A1 | * | 6/2017 | ............ F01D 5/02 |
| GB | 1516041 A | | 6/1978 | |
| GB | 2041090 A | | 9/1980 | |
| GB | 2426792 A | | 12/2006 | |
| WO | 9603585 A1 | | 2/1996 | |
| WO | 2005100750 A1 | | 10/2005 | |
| WO | 2007038674 A1 | | 4/2007 | |

OTHER PUBLICATIONS

QCSEE over-the-wing final design report. (1977). NASA-CR-134848. Jun. 1, 1977. pp. 1-460.

QCSEE over-the-wing propulsion system test report vol. III-mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

(56) References Cited

OTHER PUBLICATIONS

QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines-Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France, pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Sawyer S., et al., "Source Control of Turbomachine Discrete-Frequency Tone Generation," 1996, International Compressor Engineering Conference, Retrieved from the Internet: URL: https://pdfs.semanticscholarorg/e357/b26490288e00dd7a846c7790c20df6e4b337.pdf.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley Sons, Inc. pp. 722-6 and 764-71.
Shah, D.M. (1992). MoSi2 and other silicides as high temperature structural materials. Superalloys 1992. The Minerals, Metals, Materials Society. pp. 409-422.

Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-76.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
State of Grounds of Appeal in European Patent No. 3093051 (16164202.0) by Safran Aircraft Engines dated Jan. 5, 2022. [with English translation].
Statement of Grounds of Appeal in European Patent Application No. 16164202.0 (3093501) by Safran Aircraft Engines dated Jan. 11, 2022. [wth English translation].
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-23.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-46.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-49.
Sweetman, B. and Sutton, O. (1998). Pratt Whitney's surprise leap. Interavia Business Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-38.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-8.
Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Hendricks, E.S. and Tong, M.T. (2012). Performance and weight estimates for an advanced open rotor engine. NASA/TM-2012-217710. pp 1-13.
Hess, C. (1998). Pratt Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-8.
Hill, P.G., Peterson, C.R. (1992). Mechanics and thermodynamics of propulsion, 2nd Edition. Addison-Wesley Publishing Company, Inc. pp. 400-6.

(56) References Cited

OTHER PUBLICATIONS

Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines-Turbofan. Feb. 9, 2012.
Honeywell LF502. Jane's Aero-engines, Aero-engines-Turbofan. Aug. 17, 2016.
Honeywell LF507. Jane's Aero-engines, Aero-engines-Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines-Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Howe, D.C., and Wynosky, T.A. (1985). Energy efficient engine program advanced turbofan nacelle definition study. NASA-CR-174942. May 1985. pp. 1-60.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, Nv. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
Ivchenko-Progress AI-727M. Jane's Aero-engines, Aero-engines-Turbofan. Nov. 27, 2011.
Ivchenko-Progress D-436. Jane's Aero-engines, Aero-engines-Turbofan. Feb. 8, 2012.
Ivchenko-Progress D-727. Jane's Aero-engines, Aero-engines-Turbofan. Feb. 7, 2007.
Jacobson, N.S. (1993). Corrosion of silicon-based ceramics in combustion environments. J. Am. Ceram. Soc. 76 (1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.

Kandebo, S.W. (1998). Pratt Whitney launches geared turbofan engine. Aviation Week Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press, p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Korte D., et al., "Low Noise Compressor Design with a Linearized Euler Method", ECCOMAS 200, Jul. 24-28, 2004, pp. 1-18.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,689,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.

(56) References Cited

OTHER PUBLICATIONS

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-22.
El-Sayad, A.F. (2008). Aircraft propulsion and gas turbine engines. Boca Raton, FL: CRC Press. pp. 215-9 and 855-60.
European Search Report for Application No. EP16164202.0, dated Oct. 10, 2016, 9 pages.
Faghri, A. (1995). Heat pipe and science technology. Washington, D.C.: Taylor Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for United States U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Technical Report. (1977). Quiet Clean Short-haul Experimental Engine (QCSEE) Under-the-Wing (UTW) final design report. NASA-CR-134847. Jun. 1, 1977. pp. 1-697.
The Jet Engine, Rolls-Royce plc, 5th Edition, 1996, pp. 19-26.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Touyeras A., et al., "Aerodynamic design and test result analysis of a three stage research compressor," Proceedings of ASME Turbo Expo 2004: Power for Land, Sea, and Air, Jun. 14-17, 2004. pp. 1-9.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental

(56) References Cited

OTHER PUBLICATIONS investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines-Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Uslu S., et al., "Simulation of noise generation due to blade row interaction in a high speed compressor", Aerospace Science and Technology, Jun. 8, 2004, pp. 209-306.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for Nasa. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.
WIKIPEDIA. Stiffness. Retrieved Jun. 28, 2018 from: https://en.wikipedia.org/wiki/Stiffness.
WIKIPEDIA. Torsion spring. Retrieved Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wolff T., et al., "Validating the numerical prediction of the aerodynamics of an axial compressor," Proceedings of ASME Turbo Expo 2014: Turbine Technical Conference and Exposition, Jun. 16-20, 2014, pp. 1-14.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
2003 NASA seal/secondary air system workshop. (2003). NASA/CP-2004-212963/vol. 1. Sep. 1, 2004. pp. 1-408.
About Gas Turb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley Sons, Inc. New York: New York. pp. 1-11, 13-23, 26-33, 50-1, 56-8, 60-1, 64-71, 87-9, 324-9, 436-7.
AGMA Standard (1997). Design and selection of components for enclosed gear drives. lexandria, VA: American Gear Manufacturers Association. pp. 1-48.
AGMA Standard (1999) Flexible couplings-Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine Aeroengine Congress Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines-Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-84.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp 1-28.

(56) References Cited

OTHER PUBLICATIONS

Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017- Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Communication of the Board of Appeal pursuant to Article 15(1) of the Rules of Procedure of the Board of Appeal in European Patent Application No. 16164202.0 (3093501) mailed Apr. 26, 2023.
Counter Response by Safran Aircraft Engines in European Application No. 16164202.0 (3093501) mailed Nov. 22, 2022.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-7.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-63.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design economics studies. NASA CR-195443. Apr. 1995. pp. 1-187.
Litt, U.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lowson M.V., "Reduction of Compressor Noise Radiation", The Journal of the Acoustical Society of America, 1968, vol. 43, Issue. 1, pp. 37-50.
Lowson M.V., "Theoretical Studies of Compressor Noise", NASA-CR-1287, Mar. 1969, pp. 1-100.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley Sons, Ltd. pp. 260-5.
Mancuso, J.R. and Corcoran, J.P. (2003). What are the differences in high performance flexible couplings for turbomachinery Proceedings of the Thirty-Second Turbomachinery Symposium. 2003. pp. 189-207.
Manual. Student's Guide to Learning SolidWorks Software. Dassault Systemes-SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mavris, D.N., Schutte, U.S. (2016). Application of deterministic and probabilistic system design methods and enhancements of conceptual design tools for ERA project final report. NASA/CR-2016-219201. May 1, 2016. pp. 1-240.
Mcardle, J.G. and Moore, A.S. (1979). Static test-stand performance of the YF-102 turobfan engine with several exhaust configurations

(56) References Cited

OTHER PUBLICATIONS for the Quiet Short-Haul Research Aircraft (QSRA). Prepared for NASA. NASA-TP-1556. Nov. 1979. pp. 1-68.

Mccracken, R.C. (1979). Quiet short-haul research aircraft familiarization document. NASA-TM-81149. Nov. 1, 1979. pp. 1-76.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Michel U., "Aircraft noise reduction by technical innovations", AIAA/CEAS Aeroacoustics Conference, May 27-29, 2013, Berlin, pp. 1-50.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Notice of Opposition of European Patent No. EP3093501, by Safran Aircraft Engines, dated Jun. 26, 2019, 42 pages.

Oates, G.C. (Ed). (1989). Aircraft propulsion systems and technology and design. Washington, D.C.: American Institute of Aeronautics, Inc. pp. 341-344.

Ovenden N.C., et al., "Cut-on cut-off transition in flow ducts: Comparing multiple-scales and finite-element solutions," American Institute of Aeronautics and Astronautics, AIAA 2004-2945, 2012, Retrieved from: https://arc.aiaa.org/doi/10.2514/62004-2945, 18 pages. Parametric study of STOL short-haul transport engine cycles and operational techniques to minimize community noise impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

\* cited by examiner

MODAL NOISE REDUCTION FOR GAS TURBINE ENGINE

CROSS-REFERENCE TO RELATED APPLICATION

This application is a continuation of U.S. patent application Ser. No. 17/689,260, filed Mar. 8, 2022, which is a continuation of U.S. patent application Ser. No. 16/532,554, filed Aug. 6, 2019, which is a continuation of U.S. patent application Ser. No. 14/680,409 filed Apr. 7, 2015.

BACKGROUND

A gas turbine engine typically includes a fan section, a compressor section, a combustor section, and a turbine section. The compressor section compresses air and delivers it into a combustion chamber. The compressed air is mixed with fuel and combusted in the combustion section. Products of this combustion pass downstream over turbine rotors. The compressor is typically provided with rotating blades, and stator vanes adjacent to the blades. The stator vanes control the flow of the air to blades. The arrangement between the stator vanes and the blades has an influence on the amount of noise (e.g., sound) generated by the engine.

SUMMARY

An exemplary section of a gas turbine engine according to this disclosure includes, among other things, a first array of airfoils including a first number of airfoils, and a second array of airfoils downstream of the first array of airfoils. The second array includes a second number of airfoils. The second number of airfoils is at least 1.19 times the first number of airfoils thereby providing a predetermined modal response.

In a further non-limiting embodiment of the foregoing section, the second number of airfoils is within a range between 1.19 and 1.55 times the first number of airfoils.

In a further non-limiting embodiment of the foregoing section, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing section, the stagger angle is the incline of a chord between a leading edge and a trailing edge of an airfoil relative to a direction parallel to an engine central longitudinal axis.

In a further non-limiting embodiment of the foregoing section, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

In a further non-limiting embodiment of the foregoing section, n and k are equal to 1.

In a further non-limiting embodiment of the foregoing section, the section includes a plurality of arrays of airfoils, and a number of airfoils in each array is at least 1.19 times a number of airfoils in an immediately upstream array.

In a further non-limiting embodiment of the foregoing section, the number of airfoils in each array is within a range between 1.19 and 1.55 times the number of airfoils in the immediately upstream array.

In a further non-limiting embodiment of the foregoing section, the first array of airfoils is an array of stator vanes, and wherein the second array of airfoils is an array of rotor blades.

In a further non-limiting embodiment of the foregoing section, the section is a low pressure compressor.

A gas turbine engine according to an exemplary aspect of the present disclosure includes, among other things, a low pressure compressor including a first array of airfoils and a second array of airfoils downstream of the first array. The first array includes a first number of airfoils and the second array includes a second number of airfoils. The second number of airfoils is at least 1.19 times the first number of airfoils thereby providing a predetermined modal.

In a further non-limiting embodiment of the foregoing engine, the second number of airfoils is within a range between 1.19 and 1.55 times the first number of airfoils.

In a further non-limiting embodiment of the foregoing engine, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing engine, the stagger angle is the incline of a chord between a leading edge and a trailing edge of an airfoil relative to a direction parallel to an engine central longitudinal axis.

In a further non-limiting embodiment of the foregoing engine, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

In a further non-limiting embodiment of the foregoing engine, n and k are equal to 1.

A method according to an exemplary aspect of this disclosure includes, among other things, controlling an interaction between a first array of airfoils and a second arrays of airfoils during operation of a gas turbine engine by providing a number of airfoils in the second array that is at least 1.19 times the number of airfoils in the first array. The second array of airfoils is downstream of the first array of airfoils.

In a further non-limiting embodiment of the foregoing method, the number of airfoils in the second array is within a range between 1.19 and 1.55 times the number of airfoils in the first array.

In a further non-limiting embodiment of the foregoing method, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing method, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor; where n is the harmonic of blade passing frequency, and k is the harmonic of vane passing frequency.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
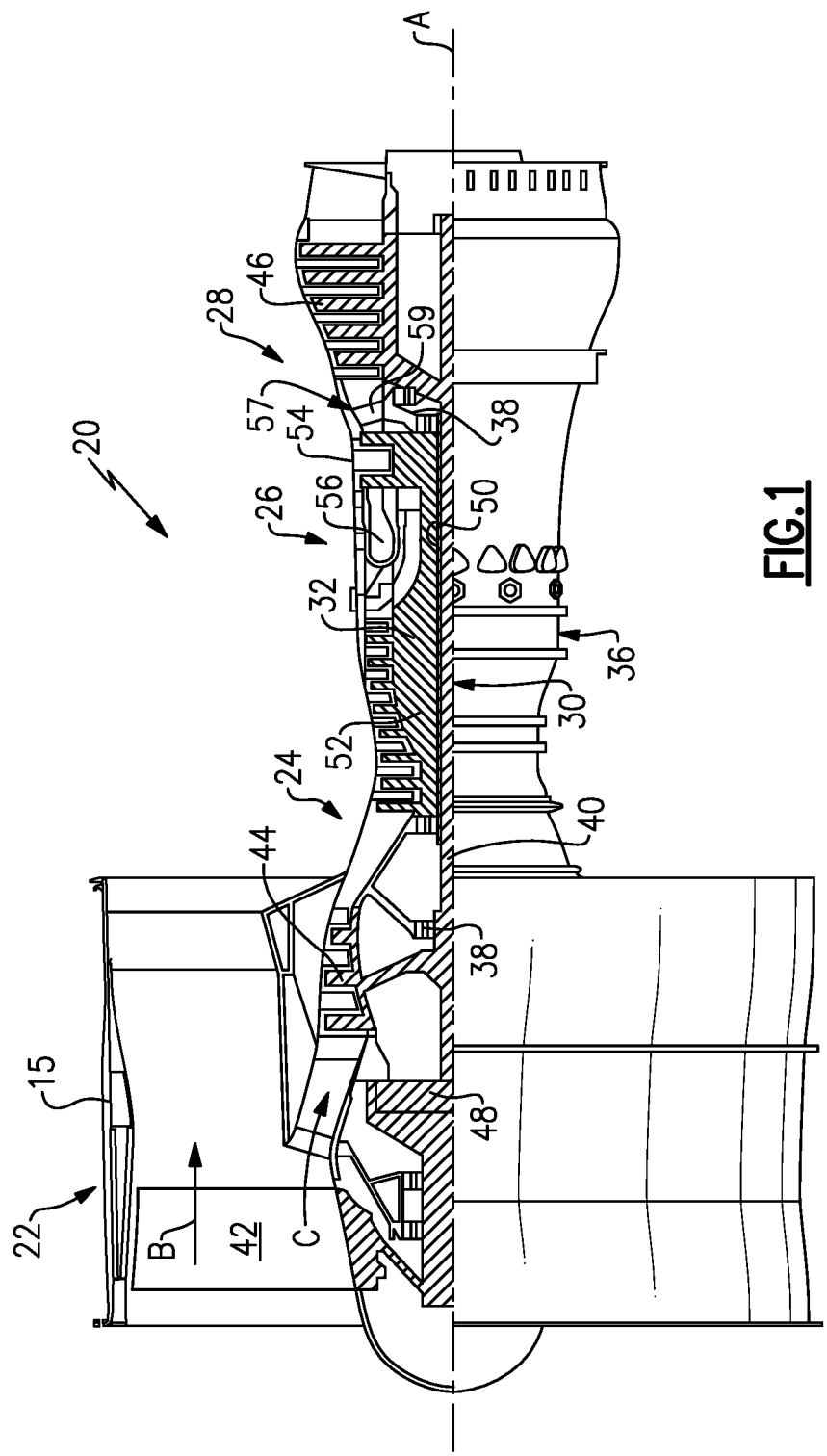
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
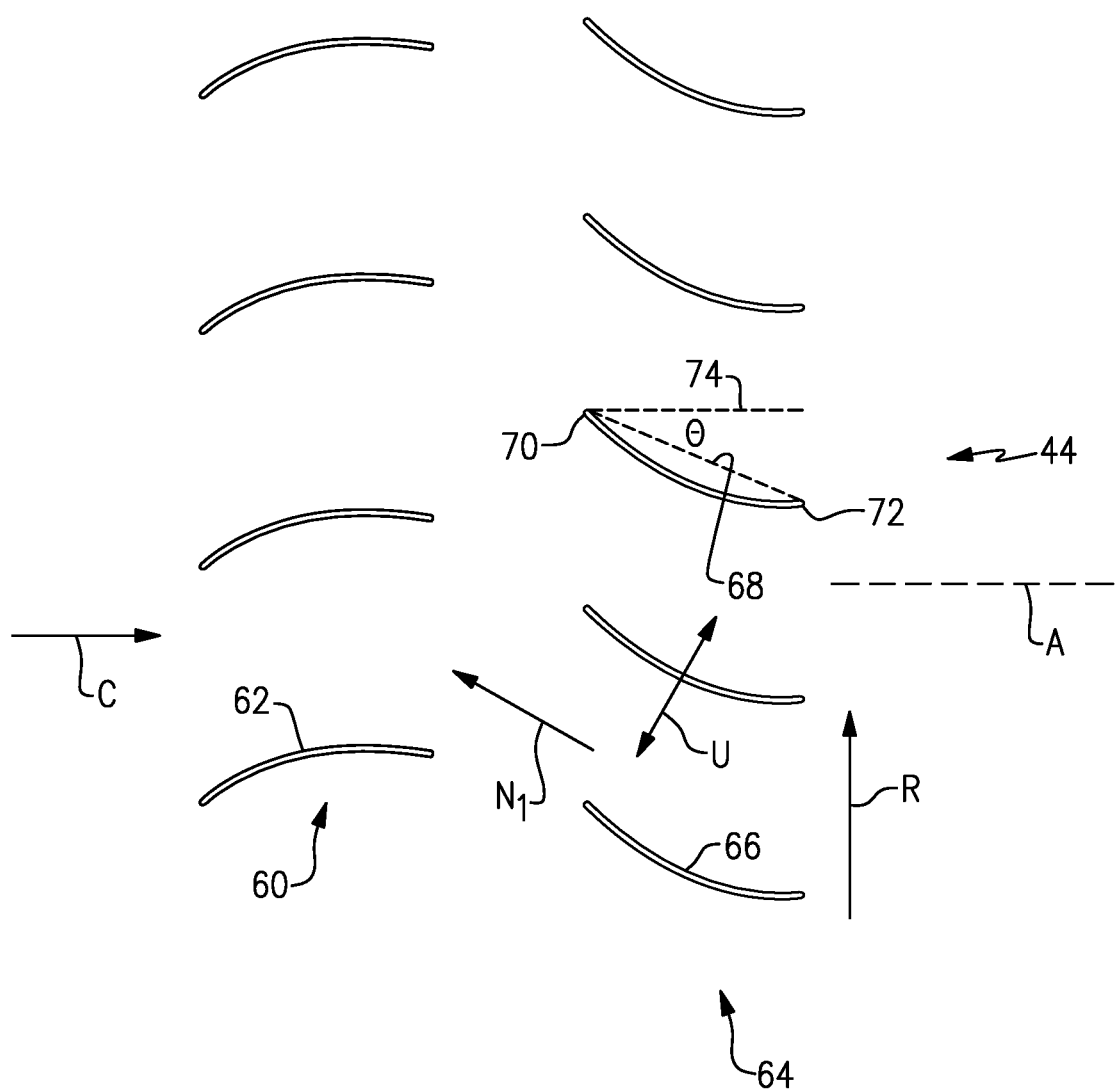
FIG. 2 is a highly schematic view of a section of the gas turbine engine, and in particular illustrates a modal, cuton interaction between adjacent airfoil arrays.

FIG. 2 is a highly schematic view of a portion of a section of the gas turbine engine 20. In this example, the section is the low pressure compressor 44. However, it should be understood that this disclosure may be useful in other sections of the gas turbine engine 20.

In this example, the low pressure compressor 44 includes a plurality of compression stages, each including an array of rotor blades and an array of stator vanes. FIG. 2 shows two adjacent airfoil arrays. A first array 60 includes a first number airfoils 62, which in this example may be stator vanes. A second array 64 of airfoils, which is immediately downstream of the first array 60, includes a second number of airfoils 66. Continuing with the example, the airfoils 66 in the second array 64 are rotor blades configured to rotate about the engine central longitudinal axis A.

The relationship between the number of airfoils in the first array 60 and the number of airfoils in the second array 62 can be controlled to reduce engine noise. To this end, a concept known as "cutoff" has been used in the design of compressors. "Cutoff" designs are typically used in larger engines. In a cutoff configuration, the vane-blade ratio is set such that the blade passing frequency decays in the duct. Another known concept is "high frequency." This solution is typically beneficial in engines with relatively high speed low pressure compressors. Another concept separate from "cutoff" and "high frequency" is called "cuton" (sometimes spelled "cut-on"). In a cuton configuration, the vane-blade ratio is set such that blade passing frequency propagates in the duct.

In this disclosure, the number of airfoils between adjacent arrays is selected such that, while not "cutoff," there is a controlled "modal" interaction between the adjacent arrays. As will be appreciated from the below, the nature of the "modal" interaction reduces sound effectively even though "cutoff" cannot be achieved.

In one example of this disclosure, each successive downstream array of airfoils in the low pressure compressor 44 includes more airfoils than the upstream array. In particular, the number of airfoils in the subsequent, downstream array is a factor of the number of airfoils in the immediately upstream array. In one example, the factor F is the same for each successive array, and is defined by the following equation:

$$F = 1 + \frac{M_{tip}\sin\theta}{1 - M} \quad \text{(Equation 1)}$$

where, for the aircraft's approach power conditions, $M_{tip}$ is a tip rotational Mach number, M is the Mach number into the downstream array from the downstream array's frame of reference, and θ is a stagger angle of the downstream array. The factor F is a vane/blade ratio (V/B as defined below) when the upstream array is a rotor and the downstream array is a stator. The factor F is a blade/vane ratio (B/V as defined below) when the upstream array is a stator and the downstream array is a rotor. F can be defined in general by:

$$F = \frac{kV}{nB}; \text{for upstream rotor, downstream stator} \quad \text{(Equation 2)}$$

$$F = \frac{kB}{nV}; \text{for upsream stator, downstream rotor} \quad \text{(Equation 3)}$$

where n is the harmonic of blade passing frequency, B is the number of rotor blades in the blade row interaction, k is the harmonic of vane passing frequency, and V is the number of stator vanes in the stator row interaction. Further, in one example, the stagger angle θ is the incline of a chord 68 between a leading edge 70 and a trailing edge 72 of an airfoil relative to a line 74 parallel to the engine central longitudinal axis A. Alternatively, the stagger angle θ could be the angle of a line tangent to the leading edge.

In this example, the value for n is 1 because the first harmonic of blade passing frequency has the most significant impact on noise reduction. The value for k is also 1, because this is the only cuton mode for the first harmonic of blade passing frequency.

The result of the above Equations 1, 2, and 3 provides maximum noise reduction when in a "cuton" state when the factor F is at least 1.19. In particular, the maximum noise reduction is achieved when the factor F is within a range between 1.19 and 1.55. That is, for a rotor blade passing frequency, the number of airfoils in an array is within a range between 1.19 and 1.55 times the number of airfoils in the immediately upstream array.

The range of the factor F is further defined by the following equations, which are the result of combining Equations 1, 2, and 3.

$$\frac{V}{B} = \frac{n}{k}\left(1 + \frac{M_{tip}\sin\theta}{1 - M}\right); \quad \text{(Equation 4)}$$

for an upstream rotor/downstream stator $$\frac{B}{V} = \frac{k}{n}\left(1 + \frac{M_{tip}\sin\theta}{1 - M}\right); \quad \text{(Equation 5)}$$

for an upstream stator/downstream rotor

In one example, the first array 60 includes 30 stator vanes circumferentially spaced around a disk. In that example, the second array 64 could include between 36 and 47 rotor blades. Continuing with that example, a third array (not pictured) immediately downstream of the second array 64 could include between 43 and 56 stator vanes, and so on.

This could go on for as many interactions as required. In some cases only a portion of the stages within a particular engine section would be defined by this range. For instance, in a geared turbofan, in one example the first compressor stage may be cutoff while the second and third stages would be modal, cuton, and follow the range defined above. It should be noted that the term "stage" as used in this disclosure may refer to a stator-rotor-stator combination.

Figure 3:
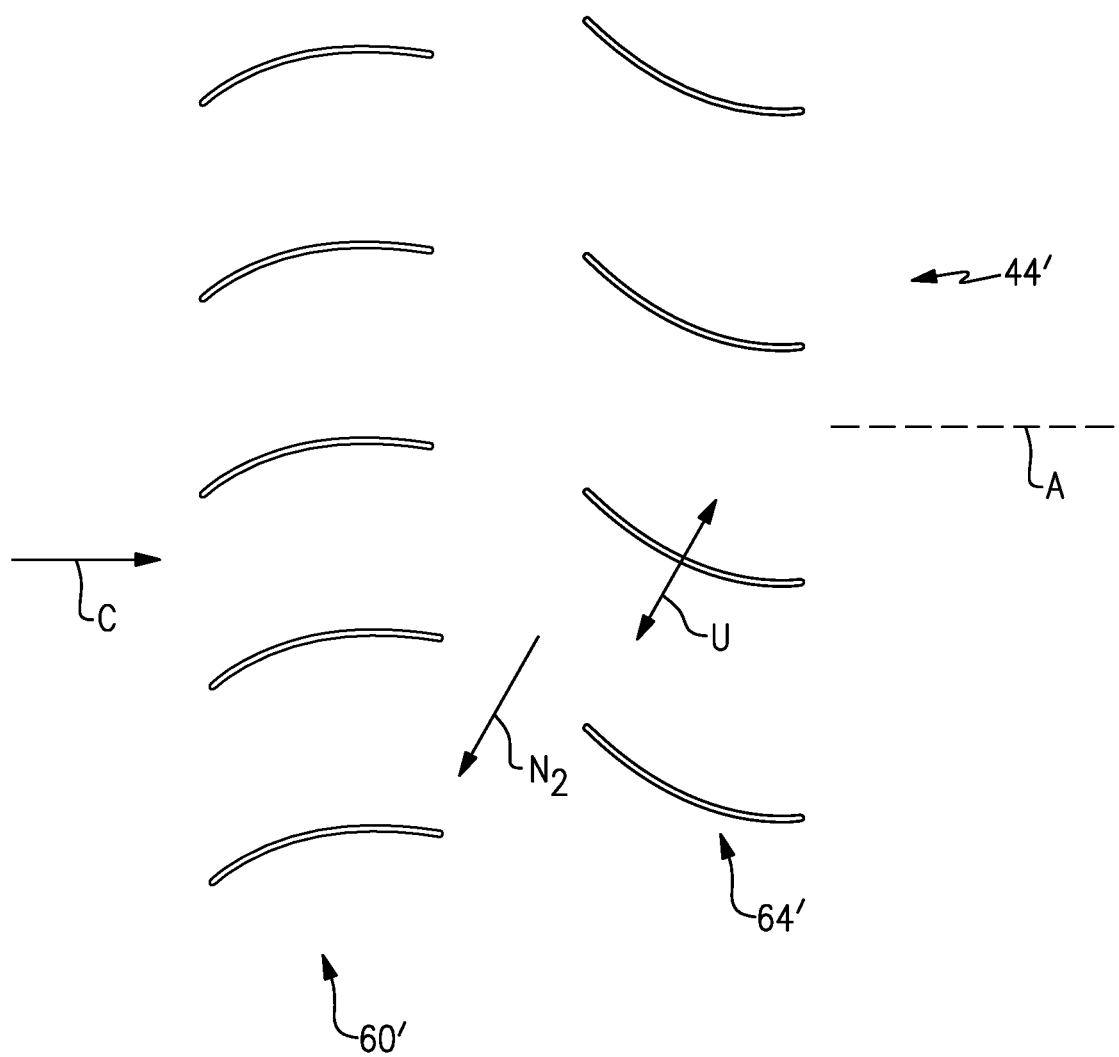
FIG. 3 is another highly schematic view of the section of the gas turbine engine, and in particular illustrates a non-modal, cuton interaction between adjacent airfoil arrays.

The effect of selecting the relative number of airfoils using the factor F is illustrated schematically between FIGS. 2 and 3. With reference to FIG. 2, a modal, cuton arrangement is illustrated. In FIG. 2, the number of airfoils 66 in the second array 64 is dictated by the factor F. As the rotor blades of the second array 64 rotate during operation of the gas turbine engine 20, a pulsing, unsteady pressure is distributed along each airfoil 66. The average direction of this pulsing, unsteady pressure is illustrated at U, and is known as the direction of unsteady lift. The average direction of the unsteady lift U is substantially perpendicular to the direction of the chord 68.

Because of the selected number of airfoils between the first array 60 and the second array 64, noise (i.e., sound) propagates generally in the direction $N_1$. As illustrated, the noise wave propagation direction $N_1$ is substantially perpendicular to the direction of the unsteady lift U. Thus, the pulsating pressure waves of the unsteady lift U do not couple effectively with the noise waves. As a result, the amplitude of the noise waves generated by this interaction is reduced, which in turn reduces noise.

FIG. 3 illustrates a non-modal, cuton arrangement. In FIG. 3, an example low pressure compressor 44' includes a first, upstream array 60' having a number of airfoils that outnumbers those of the second, downstream array 64'. In this example, noise propagates in a direction $N_2$, which is substantially parallel to the direction of unsteady lift U. In this instance, the pressure waves from the unsteady lift U couple better with the noise waves than they do in the FIG. 2 arrangement, and thus there is no significant noise reduction.

Figure 4:
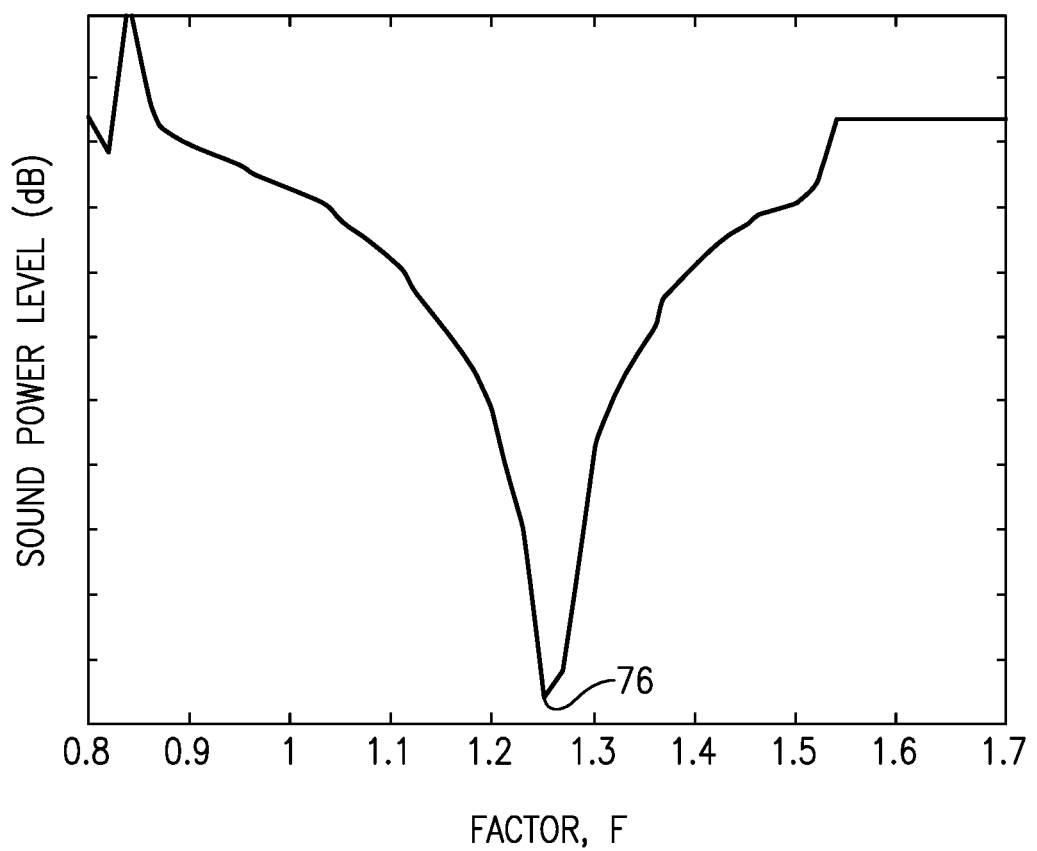
FIG. 4 graphically illustrates the relationship between sound power level and the ratio between the number of airfoils in a downstream array versus the number of airfoils in a upstream array.

FIG. 4 graphically illustrates the relationship between sound power level, in decibels (dB), and the factor F. As mentioned above, when "cutoff" is not possible, maximum noise reduction is achieved when the factor F is within a range between 1.19 and 1.55. As shown above in Equation 1, the factor F is variable based on a number of factors. One particular factor is airfoil shape (including, as examples, characteristics like airfoil camber and airfoil metal angle distribution along the chord), which is captured by stagger angle θ in this example. FIG. 4 shows a plot of sound power level to the factor F for a particular stagger angle θ. In this example, the largest amount of sound reduction is achieved at point 76, which corresponds to a factor F of about 1.25. This factor F is within the range between 1.19 and 1.55 mentioned above.

As mentioned, this disclosure provides a modal, cuton airfoil arrangement, which achieves substantial noise reduction relative to non-modal cuton arrangements. This disclosure has particular benefit in small engines that cannot achieve a cutoff arrangement. As mentioned above, this disclosure has benefits in other engines where certain stages can be "cutoff," while others may benefit from a modal, cuton interaction.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine comprising:
   propulsor means for providing propulsion;
   first compression means for compressing airflow from the propulsor means;
   second compression means for compressing airflow from the first compression means;
   reduction means for reducing a rotational speed of an output that drives the propulsor means relative to an input;
   first expansion means for driving the second compression means in response to expanding airflow from the second compression means;
   second expansion means for driving the input of the reduction means in response to expanding airflow from the first expansion means;
   wherein the first compression means includes a plurality of arrays of rotor blades and a plurality of arrays of stator vanes arranged in a plurality of compression stages, the first expansion means includes a plurality of arrays of rotor blades arranged in a plurality of expansion stages, and the first compression means includes a greater number of compression stages than a total number of the expansion stages of the first expansion means; and
   wherein a factor (F) is defined as a total number of the rotor blades in an array of the plurality of arrays divided by a total number of the stator vanes in an adjacent array of the plurality of arrays, and the factor (F) is between 1.19 and 1.55 for at least two of the arrays of the rotor blades of the first compression means.

2. The gas turbine engine as recited in claim 1, wherein the reduction means establishes a reduction ratio of greater than 2.3.

3. The gas turbine engine as recited in claim 2, wherein the plurality of compression stages of the first compression means includes three compression stages.

4. The gas turbine engine as recited in claim 2, wherein the reduction means includes an epicyclic gear train.

5. The gas turbine engine as recited in claim 4, wherein the adjacent arrays of the stator vanes are immediately upstream of the respective arrays of the rotor blades.

6. The gas turbine engine as recited in claim 5, wherein each array of the rotor blades meeting the factor (F) includes 36 rotor blades.

7. The gas turbine engine as recited in claim 5, wherein each adjacent array of the stator vanes meeting the factor (F) includes 30 stator vanes.

8. The gas turbine engine as recited in claim 4, wherein the factor (F) is the same for each array of the rotor blades of the first compression means.

9. The gas turbine engine as recited in claim 4, wherein the second expansion means includes a plurality of arrays of rotor blades arranged in five expansion stages.

10. The gas turbine engine as recited in claim 2, wherein a most upstream compression stage of the first compression means does not meet the factor (F).

11. The gas turbine engine as recited in claim 2, wherein the second expansion means expands airflow from the first expansion means to establish a pressure ratio of greater than 5:1, and the pressure ratio is a ratio of a pressure measured prior to an inlet of the second expansion means as related to a pressure at an outlet of the second expansion means prior to any exhaust nozzle.

12. The gas turbine engine as recited in claim 2, wherein the propulsion means delivers a portion of airflow to the first compression means and delivers another portion of airflow to a bypass duct for providing propulsion to establish a bypass ratio.

13. The gas turbine engine as recited in claim 12, wherein the bypass ratio is greater than 10.

14. The gas turbine engine as recited in claim 13, wherein the plurality of compression stages of the first compression means includes three compression stages.

15. The gas turbine engine as recited in claim 14, wherein the second expansion means drives both the first compression means and the input of the reduction means.

16. The gas turbine engine as recited in claim 15, wherein each adjacent array of the stator vanes is immediately upstream of the respective array of the rotor blades that meets the factor (F).

17. The gas turbine engine as recited in claim 16, wherein the factor (F) is the same for each compression stage of the first compression means.

18. The gas turbine engine as recited in claim 16, wherein each array of the rotor blades meeting the factor (F) includes 36 rotor blades.

19. The gas turbine engine as recited in claim 16, wherein each adjacent array of the stator vanes meeting the factor (F) includes 30 stator vanes.

20. The gas turbine engine as recited in claim 16, wherein the reduction means includes a planetary gear system.

* * * * *